(12) United States Patent
Ellis et al.

(10) Patent No.: US 11,115,707 B2
(45) Date of Patent: *Sep. 7, 2021

(54) SYSTEMS AND METHODS FOR MANAGING LOCAL STORAGE OF ON-DEMAND CONTENT

(71) Applicant: Rovi Guides, Inc., San Jose, CA (US)

(72) Inventors: Michael D. Ellis, Boulder, CO (US); Robert A. Knee, Lansdale, PA (US); Michael L. Craner, Chester Springs, PA (US)

(73) Assignee: ROVI GUIDES, INC., San Jose, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/531,900

(22) Filed: Aug. 5, 2019

(65) Prior Publication Data

US 2019/0356945 A1 Nov. 21, 2019

Related U.S. Application Data

(63) Continuation of application No. 14/842,756, filed on Sep. 1, 2015, now Pat. No. 10,419,810, which is a
(Continued)

(51) Int. Cl.
| | |
|---|---|
| *H04N 21/4627* | (2011.01) |
| *H04N 21/4335* | (2011.01) |
| *H04N 5/913* | (2006.01) |
| *H04N 7/167* | (2011.01) |
| *H04N 21/433* | (2011.01) |
| *H04N 21/472* | (2011.01) |
| *H04N 21/8355* | (2011.01) |
| *H04N 21/845* | (2011.01) |
| *H04N 7/173* | (2011.01) |
| *H04N 21/254* | (2011.01) |

(Continued)

(52) U.S. Cl.
CPC ........ *H04N 21/4335* (2013.01); *H04N 5/913* (2013.01); *H04N 7/1675* (2013.01); *H04N 7/17318* (2013.01); *H04N 21/2541* (2013.01); *H04N 21/42623* (2013.01); *H04N 21/4331* (2013.01); *H04N 21/44222* (2013.01); *H04N 21/4627* (2013.01); *H04N 21/47202* (2013.01); *H04N 21/6336* (2013.01); *H04N 21/8355* (2013.01); *H04N 21/8456* (2013.01); *H04N 2005/91328* (2013.01)

(58) Field of Classification Search
CPC ..... H04N 2005/91328; H04N 21/2541; H04N 21/42623; H04N 21/4331; H04N 21/4335; H04N 21/44222; H04N 21/4627; H04N 21/47202; H04N 21/6336; H04N 21/8355; H04N 21/8456; H04N 5/913; H04N 7/1675; H04N 7/17318

See application file for complete search history.

(56) References Cited

U.S. PATENT DOCUMENTS

| | | | | |
|---|---|---|---|---|
| 7,206,892 | B2 * | 4/2007 | Kim ...................... | G06F 21/10 386/243 |
| 2004/0187159 | A1 * | 9/2004 | Gaydos, Jr. ........ | H04N 21/2181 725/92 |
| 2005/0129042 | A1 * | 6/2005 | Muhonen ............... | H04H 60/27 370/412 |

* cited by examiner

*Primary Examiner* — Olugbenga O Idowu
(74) *Attorney, Agent, or Firm* — Haley Guiliano LLP

(57) ABSTRACT

On-demand systems and methods are provided to manage locally-stored on-demand content. A user's equipment controls the deletion of and/or access to on-demand content from a local storage device based on constraining criteria
(Continued)

that may include rental conditions, dynamic factors, and keys.

20 Claims, 12 Drawing Sheets

Related U.S. Application Data continuation of application No. 12/506,086, filed on Jul. 20, 2009, now Pat. No. 9,143,736, which is a continuation of application No. 11/240,552, filed on Sep. 30, 2005, now abandoned.

(51) Int. Cl.
*H04N 21/426* (2011.01)
*H04N 21/442* (2011.01)
*H04N 21/6336* (2011.01)

SYSTEMS AND METHODS FOR MANAGING LOCAL STORAGE OF ON-DEMAND CONTENT

CROSS-REFERENCE TO RELATED APPLICATIONS

This application is a continuation of U.S. patent application Ser. No. 14/842,756 (now allowed), which is a continuation of U.S. patent application Ser. No. 12/506,086, filed Jul. 20, 2009 (now U.S. Pat. No. 9,143,736), which is a continuation of U.S. patent application Ser. No. 11/240,552, filed Sep. 30, 2005 (abandoned), all of which are hereby incorporated by reference herein in their entireties.

BACKGROUND OF THE INVENTION

This invention relates to on-demand systems. More particularly, this invention relates to managing local storage of on-demand content in on-demand systems.

On demand systems (e.g., video-on-demand (VOD) systems) have been developed that allow a user to order content (e.g., a video program) from an on demand server for playback (or execution, in the case of an application) by the user's equipment. In some approaches, a rental period associated with a VOD program defines a period of time during which a user may access the content. Rental periods may, or may not, be fee based.

For example, in a VOD system, it may be desirable to store a VOD program or a portion of a VOD program at the user's equipment to allow, for example, local VCR-like playback control. If the locally-stored VOD program were accessible by the user beyond an applicable rental period, the user would be able to, perhaps, watch the VOD program in contravention of the VOD provider's viewing policies and fee structure. Thus, it is desirable to prevent the user from retrieving, or to otherwise control the user's access to, locally-stored VOD programs beyond the expiration of the applicable rental period. More generally, it is desirable to control a user's access to locally cached on-demand content beyond an applicable use period defined by the content provider.

SUMMARY OF THE INVENTION

It is an object of this invention to provide systems and methods for storing on-demand content in a local storage device and managing usage of the locally-stored on-demand content. As used herein "on-demand content" includes on-demand programs (and/or data and/or audio), on-demand applications (e.g., games and interactive mini-guides) and content related to one or more on-demand programs such as special features related to on-demand programs, on-demand program previews, related on-demand programs, on-demand associated applications (e.g., bound or unbound OpenCable Applications Platform (OCAP) applications) or a combination of such content provided as part of a package. For clarity, and not by way of limitation, the invention is at times herein discussed in the context of managing the playback of locally-cached on-demand video program content, but the principles of the invention may also be applied to managing other suitable on-demand content.

In response to a user's request for playback of on-demand content from an on-demand server, the on-demand server sends a content stream of the on-demand content to an on-demand client implemented on a user's equipment. The on-demand client stores the content stream (or a portion of it) on a local storage device to allow local playback control. The on-demand client uses constraint criteria to control the deletion of and/or access to locally-stored on-demand content. The constraint criteria may include on-demand rental conditions, dynamic factors, and/or keys, which are associated with one or more on-demand contents or categories of on-demand content. In some embodiments, the constraint criteria used to control access to locally-stored on-demand content may be different from the constraint criteria used to control deletion of locally-stored on-demand content.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
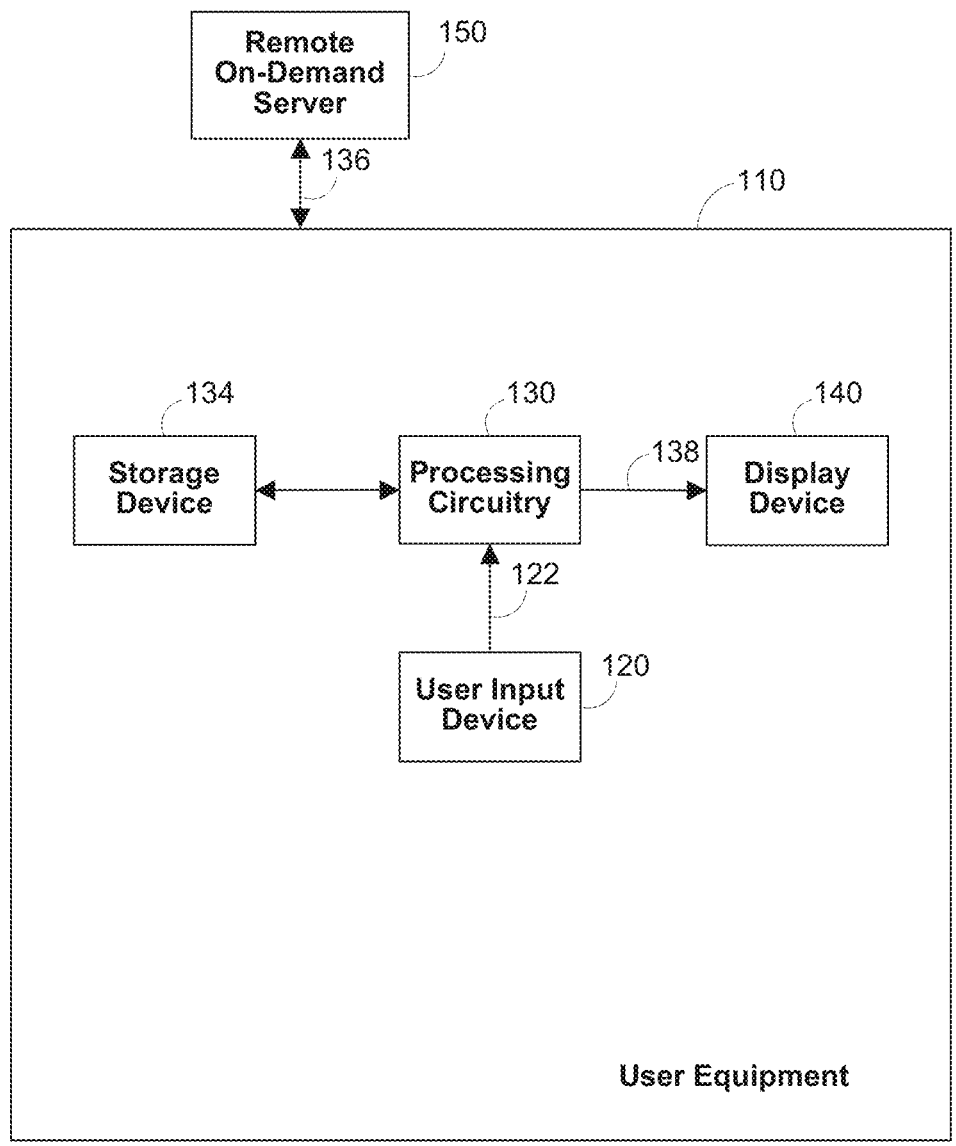
FIG. 1 is a block diagram of an on-demand system in accordance with one embodiment of the present invention.

FIG. 1 is a simplified block diagram of one embodiment of an on-demand system 100 according to the present invention. On-demand system 100 includes user equipment 110 and remote on-demand server 150. In some embodiments, on-demand content may be distributed from a head-end or remote site (not shown) to, and stored on, remote on-demand server 150. Although FIG. 1 illustrates one remote on-demand server 150 for clarity, on-demand system 100 may include more than one remote on-demand server 150 and/or additional types of servers that interface with user equipment 110.

Remote on-demand server 150, which may include a storage device and processing circuitry, communicates with user equipment 110 over communications path 136. Communications path 136 may be a satellite path, a fiber-optic path, a cable path, an Internet Protocol (IP) path, or any other suitable wired or wireless path. Data (e.g., an on-demand content stream, on-demand constraint criteria, on-demand-related messages, etc.) is sent or exchanged via communications path 136 using a synchronous delivery mechanism (e.g., MPEG-2 transport over a hybrid-fiber coax network), an asynchronous delivery mechanism (e.g., store-and-forward, best-effort, or Internet Protocol (IP)), or a combination of synchronous and asynchronous delivery mechanisms. Although communications path 136 is shown as a single path for clarity, communications path 136 may include multiple paths (e.g., multiple IP paths between user equipment 110 and multiple distributed remote on-demand servers 150).

In practice, there may be many installations of user equipment 110, but only one has been shown to avoid over-complicating the drawing. User equipment 110 may be any in-home equipment suitable for providing on-demand functionality, such as a suitably equipped television, set-top box, digital video recorder (DVR), personal video recorder (PVR), or PCTV. Whatever the chosen equipment, user equipment 110 may include at least user input device 120, processing circuitry 130, storage device 134, and display device 140. User input device 120 may be any suitable device or combination of input devices including, for example, a remote control, a keyboard, a mouse, a touch pad, a touch screen, or a voice recognition interface. Display device 140 may be any suitable device configured to provide for the output of video and audio such as, for example, a television, plasma display, LCD, or computer monitor.

Processing circuitry 130 may include a processor, such as a microprocessor, and any other suitable circuitry for providing on-demand-related functionality, including, for example, caching circuitry, video-decoding circuitry, direct memory access circuitry, input-output circuitry (including communications circuitry for communicating with remote on-demand server 150 over communications path 136), decryption circuitry, and transcryption circuitry.

Storage device 134 may be any suitable storage device or combination of coupled storage devices for storing on-demand client programming logic, data, and on-demand content including, for example, RAM, flash memory, one or more hard disk drives, removable storage media, one or more CD-ROM drives, or one or more networked drives on an in-home entertainment network.

Processing circuitry 130 executes the on-demand client to perform multiple functions, including: (1) receiving commands from user input device 120 over communications path 122 and either sending the commands to remote on-demand server 150 or processing the commands locally, (2) playing back on-demand content from storage device 134 and/or remote on-demand server 150, (3) storing on-demand content in storage device 134, and (4) controlling the deletion of and/or access to on-demand content stored on storage device 134 as a function of constraint criteria. In some embodiments the on-demand client is part of, or communicates with, an interactive television application such as an interactive television program guide.

Communications path 138 may be any suitable display interface such as, for example, a Digital Visual Interface (DVI) or FireWire Interface (IEEE 1394). Communications path 122 may be any suitable wired or wireless path (e.g., an infrared path).

In a typical use scenario, a user of on-demand system 100 selects content for playback using user input device 120. User input device 120 sends a signal to the on-demand client which, in response, requests the selected on-demand content from on-demand server 150. On-demand server 150 retrieves the on-demand content and transmits it to user equipment 110 as a digital stream (e.g., an MPEG stream). The on-demand client stores the stream in storage device 134 and may begin playing back the content from storage device 134 before the entire stream is received (i.e., when only a portion of the content is stored), or in some approaches may store the entire content stream before playing back the content. In still other approaches, the entire on-demand content is not stored locally, and a circular cache is used to store or buffer only a portion of the content at a given point in time.

Given the overhead already required to establish the communications link between remote on-demand server 150 and user equipment 110, the additional overhead required to store the entire on-demand content compared to storing a portion of the on-demand content may be minimal. Thus in some embodiments, the on-demand client stores the entirety of the on-demand content independent of whether the user actually watches the entire on-demand content. In such embodiments, the on-demand client may stop storing the entirety of an on-demand content in response to, for example, a tuner or communications path becoming unavailable, if recording the entire on-demand content is undesirable as a result of other system requirements, or if access to the program violates constraint criteria as described below.

In some embodiments, remote on-demand server 150 may encode and compress the content stream before transmitting it to user equipment 110. In such embodiments, the on-demand client stores the encoded and compressed content stream in storage device 134. The on-demand client may immediately start playing the on-demand content by retrieving the content stream from storage device 134 in a first-in, first-out (FIFO) fashion, and decoding and decompressing the stream for output to display device 140. The on-demand client may also access the stream at a later time (such as to provide the user with local playback control, or when the entire stream is stored before it is played back).

In the prior art, on-demand content stored on storage device 134, until deleted, may remain accessible to the user beyond the expiration of the on-demand service provider's rental period (which may or may not be fee-based, depending on the desired implementation). This would be undesirable as the on-demand provider could lose control over what the user does with the on-demand content. For example, the user could store the on-demand content in storage device 134 as long as the user wants (e.g., until the user deletes the on-demand content from storage device 134), or view the on-demand content as many times as the user wants.

To avoid this undesirable result, the on-demand client controls the deletion of and/or access to the on-demand content (or portions of the on-demand content) stored in storage device 134 as a function of constraint criteria associated with each content or groups of contents (e.g., on-demand contents of a particular genre, contents that cost a similar fee, or any other suitable group). The on-demand client may control the deletion of on-demand content stored in storage device 134 using the same criteria as, or different criteria from, the constraint criteria used to control access to the content. As used herein, "control access" may include, for example, controlling (a) the retrieval of the on-demand content from storage device 134, (b) the decoding of an encoded content stream, and (c) the decryption (or transcryption) of an encrypted (or transcrypted) content stream, or controlling any other activity the user may perform when accessing the locally stored on-demand content.

In some embodiments, remote on-demand server 150 transmits constraint criteria to user equipment 110. In other embodiments, another suitable server such as, for example, a different remote on-demand server 150 (i.e., an on-demand server other than the one that provided the stored on-demand content), an interactive program guide server, a digital rights management server, or an authentication server (e.g., RADIUS server), may transmit the constraint criteria. Processing circuitry 130 stores the constraint criteria in storage device 134.

Remote on-demand server 150, or another suitable server, may transmit the constraint criteria as part of, or independent from (such as part of a distinct metadata stream along the same communications path 136 or along a different communications path 136), the content stream. The constraint criteria may be transmitted prior to, at the same time as, or after the transmission of the content stream (but typically before the rental window expires). For example, constraint criteria may be transmitted at certain times (e.g., daily, weekly, monthly, or any time the constraint criteria changes) in response to a user (1) enrolling in the on-demand service, (2) the first time that the user requests playback of any on-demand content from remote on-demand server 150, (3) each time that the user requests playback of any on-demand content from remote on-demand server 150, (4) just prior to a time at which the on-demand client determines whether to delete and/or prevent the user from accessing the on-demand content from storage device 134 (but before the rental window expires), or (5) at any other suitable time.

In some embodiments, the constraint criteria may be initially stored in processing circuitry 130, storage device 134, or other circuitry in user equipment 110. In still other embodiments, a portion of the constraint criteria is provided by remote on-demand server 150 or another suitable server, and a portion is initially stored in user equipment 110.

The constraint criteria may include on-demand rental conditions. These are conditions related to the system provider's rental policies (which may or may not be fee-based). The on-demand rental conditions may, for example, specify an on-demand rental window, one or more other time periods, usage limits, or a combination of these or other suitable rental conditions. The rental conditions may, for example, specify characteristics of other on-demand content that are permitted to be, or forbidden from being, stored on storage device 134 with content or contents associated with the rental condition. Such characteristics may include, for example, availability, size, duration, pricing, marketing, whether part of a common series, whether part of a common promotional package, and other suitable factors relating to the other on-demand content.

Rental condition time periods may be defined in any suitable manner. In some embodiments, the time period is based on the time when the on-demand content was initially stored in storage device 134. For example, the on-demand client may, as a function of this time period, delete the on-demand content from, or prevent the user from accessing the on-demand content from, storage device 134 twenty-four hours after the on-demand content is stored in storage device 134.

A time period may be based, for example, on the time when the on-demand content was initially made available from remote on-demand server 150 (which is independent from the actual time that the on-demand content is ordered (e.g., by a user) and/or the time when the on-demand content was stored locally). For example, the on-demand client may, as a function of the time period, delete the on-demand content from, or prevent the user from accessing the on-demand content from, storage device 134 seven days after the on-demand content was initially made available from remote on-demand server 150.

As another example, a time period may be based on the time when the on-demand content will be removed from remote on-demand server 150. For example, the on-demand client may, as a function of the time period, delete the on-demand content from, or prevent the user from accessing the on-demand content from, storage device 134 at the same time that, or some period after, the on-demand content is removed from remote on-demand server 150.

In yet another example, a time period may be based on the time when the user first requested playback of the on-demand content from storage device 134. For example, the on-demand client may, as a function of the time period, delete the on-demand content from, or prevent the user from accessing the on-demand content from, storage device 134 twelve hours after the user initially requests playback of the on-demand content from storage device 134. The user may have ordered (e.g., purchased) the on-demand content at the same time as, or prior to, the time in which the user requested playback of the on-demand content.

In a final example, the time period may be based on the current date and time. For example, the on-demand client may, as a function of the time period, delete on-demand content from storage device 134 each Sunday at midnight.

Rental condition usage limits may also be defined in any suitable manner. The usage limit may be an allowable number of times that the user has requested playback of the on-demand content from storage device 134. For example, the on-demand client may, as a function of this rental condition, delete the on-demand content from, or prevent the user from accessing the on-demand content from, storage device 134 after the user has requested and viewed the on-demand content from storage device 134 three times.

The usage limit may be a cumulative time that the user may spend viewing the on-demand content from storage device 134. For example, the on-demand client may, as a function of this rental condition, delete the on-demand content from, or prevent the user from accessing the on-demand content from, storage device 134 after the user has spent a total of eighteen hours viewing the on-demand content in its entirety or in various portions.

The usage limit may be a parental control that limits the number of times and/or the cumulative time that a user may request and/or view an on-demand content that exceeds a particular rating (or a combination of on-demand contents that exceeds a set of ratings) from storage device 134.

The usage limit may be an allowable number of currently stored on-demand contents. For example, the on-demand client may only allow a user to store a maximum of four on-demand contents at any given time in storage device 134. In response to the user requesting a fifth on-demand content, the on-demand client may delete and/or prevent access to one of the on-demand contents currently stored in storage device 134. This maximum may be based on the number of on-demand contents in one or more categories (e.g., first-run, classic, action, comedy, movies starring a particular actor, movies in a particular series, etc.) concurrently stored in storage device 134. For example, the on-demand client may only allow a user to concurrently store a maximum of five first-run movies and/or ten classics. In response to the user requesting a sixth first-run movie (or an eleventh classic), the on-demand client may delete and/or prevent access to one of the first-run movies (or classics) currently stored in storage device 134.

In some embodiments, the constraint criteria may include dynamic factors that specify conditions of the user's equipment. Such factors may include, for example, whether the user is actively watching the on-demand content, dynamic factors regarding the availability in the local storage device (e.g., whether other system activities require use of the local storage device or other conflicts), whether the portion of the on-demand content stored in the local storage device meets a "keep" criterion (e.g., a threshold amount of the on-demand content that needs to be stored in the local storage device below which the user's equipment deletes the on-demand content from the local storage device) or a combination of such factors.

In some embodiments, the on-demand client may employ cryptographic techniques (e.g., encryption/decryption and transcryption). In such embodiments, the constraint criteria may include keys. The on-demand client uses the keys from the constraint criteria to process (e.g., decrypt, transcrypt) the content stream for display to the user. Remote on-demand server 150 can send an encrypted (or transcrypted) content stream, or a portion thereof, to user equipment 110. The on-demand client may decrypt (or transcrypt) the content stream using the keys prior to, or after, storing the content stream in storage device 134. If desired, the keys and other sensitive information may be stored in a secure memory device or otherwise handled in a secure manner.

Prior to deleting and/or preventing the user from accessing an on-demand content from storage device 134 as a function of the constraint criteria, the on-demand client may provide the user the option to extend the viewing time window of the on-demand content or otherwise relax the constraint criteria associated with the on-demand content. When the user does not accept such an option, the on-demand client may then delete and/or prevent the user from accessing the on-demand content from storage device 134. When the user accepts the option, the user may be charged a fee (e.g., at the original fee or at a discount), or may receive incentives such as special features related to the on-demand content or previews of related on-demand contents. This extended viewing time window may have the same constraint criteria as, or different constraint criteria from, the original constraint criteria for the locally-stored on-demand content.

Figure 2:
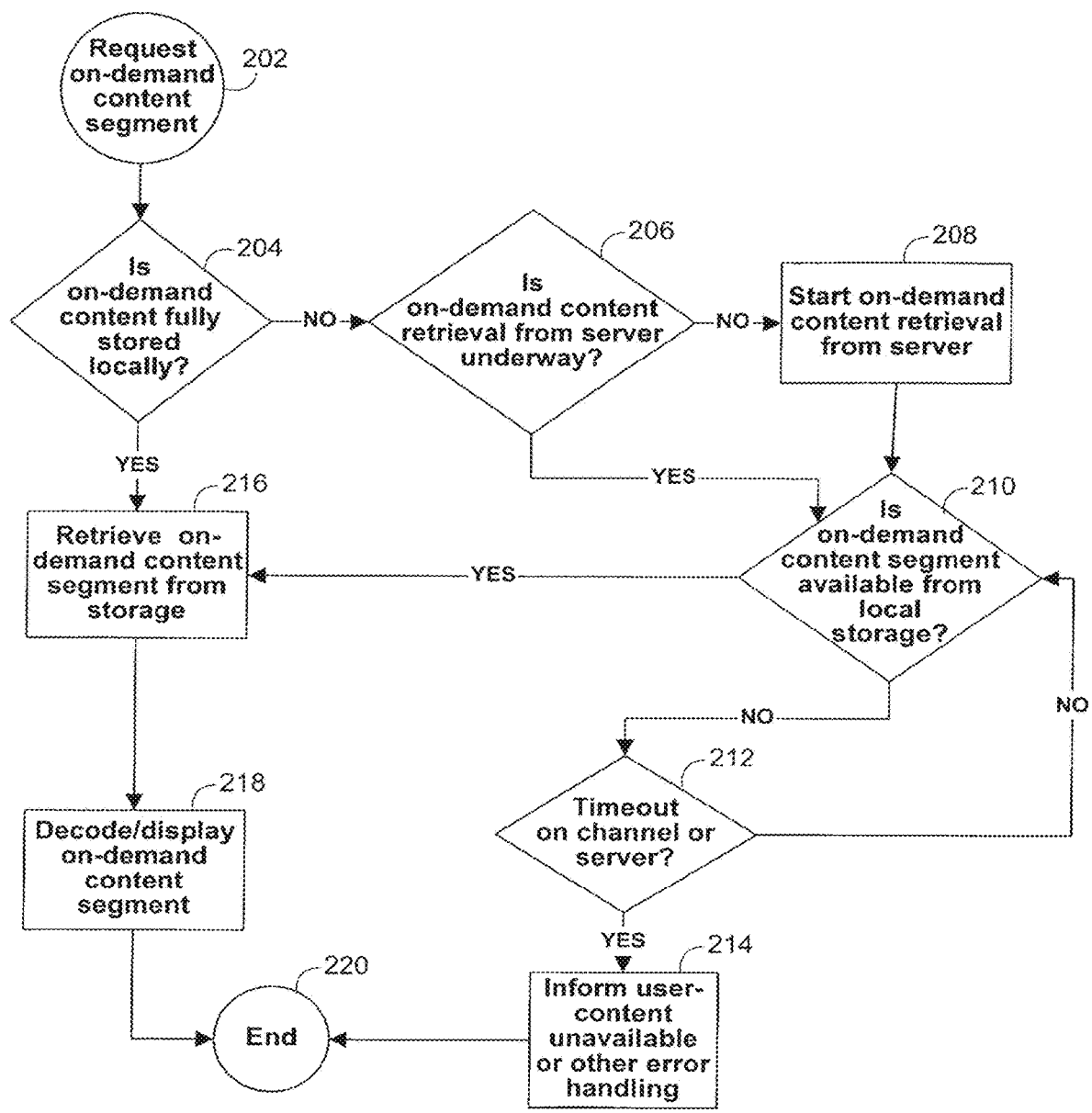
FIG. 2 is a flow chart of an illustrative process for retrieving and displaying on-demand content from a local storage device in accordance with one embodiment of the present invention.

FIG. 2 is a flow chart of an illustrative process for retrieving and displaying locally-stored on-demand contents in accordance with one embodiment of the present invention. In this embodiment, the on-demand client may begin playback prior to storing the entire content in storage device 134.

Process 200 starts at step 202 where the on-demand client receives a request for a segment (e.g., at least a portion) of on-demand content (e.g., from a local user). At step 204, the on-demand client determines whether the entire on-demand content is locally stored (e.g., in storage device 134). If the entire on-demand content is not locally stored, process 200 proceeds to step 206 where the on-demand client determines whether retrieval of the on-demand content from remote on-demand server 150 is underway. If it is not, process 200 then moves to step 208 where the on-demand client initiates the retrieval of the on-demand content from remote on-demand server 150. If at step 206 it is determined that the on-demand client has already initiated retrieval of the on-demand content, or after step 208, process 200 then moves to step 210. Under certain conditions, step 208 may be skipped. For example, it may be undesirable to attempt to retrieve an entire on-demand content when, necessary resources are unavailable, such as when a user in a single-tuner system tunes away from the on-demand content. Thus, in such a circumstance, process 200 may move directly to step 210.

At step 210, the on-demand client determines whether the requested segment of the on-demand content is available on local storage device 134. If the requested segment is not available, process 200 moves to step 212 where the on-demand client determines whether there is a resource timeout (e.g., an error state, or an exceptional delay on a tuner resource or an IP connection). If a resource timeout is detected, then in step 214, the on-demand client informs the user or system of the problem. Process 200 then ends at step 220. If a resource timeout is not detected at step 212, process 200 returns to step 210.

If the requested segment is available at step 210 or step 204, process 200 moves to step 216 where the requested segment is retrieved from local storage device 134. Then at step 218, the on-demand client decodes and displays the requested segment. Process 200 ends at step 220.

FIGS. 3-11 are flow charts of illustrative processes that the on-demand client may perform to control the deletion of and/or access to locally stored on-demand contents as a function of various combinations of constraint criteria. The on-demand client may initiate these processes in response to, for example, a triggering event or timer. In some embodiments, the on-demand client may perform one or more of these processes periodically or continuously (such as in a round-robin fashion). These processes are only illustrative as other embodiments may combine the constraint criteria in the processes of FIGS. 3-11 in any suitable combination, and may use other types of constraint criteria not shown in the figures.

Figure 3:
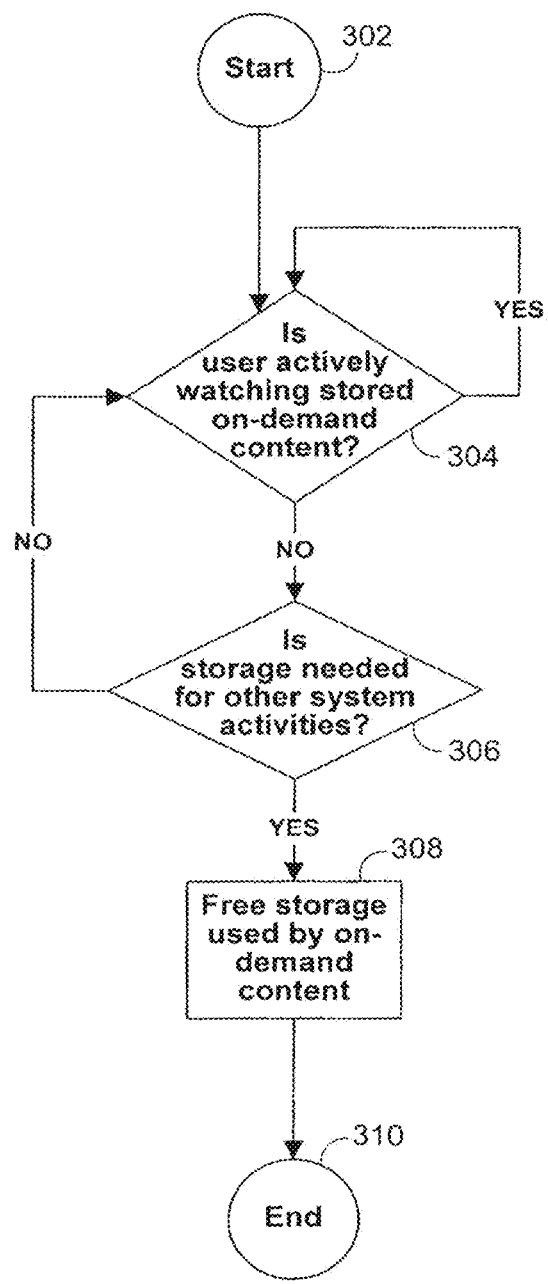
FIGS. 3 and 4 are flow charts of two illustrative processes for managing on-demand content in a local storage device as a function of dynamic factors that affect the availability in the local storage device in accordance with one embodiment of the present invention.
Figure 4:
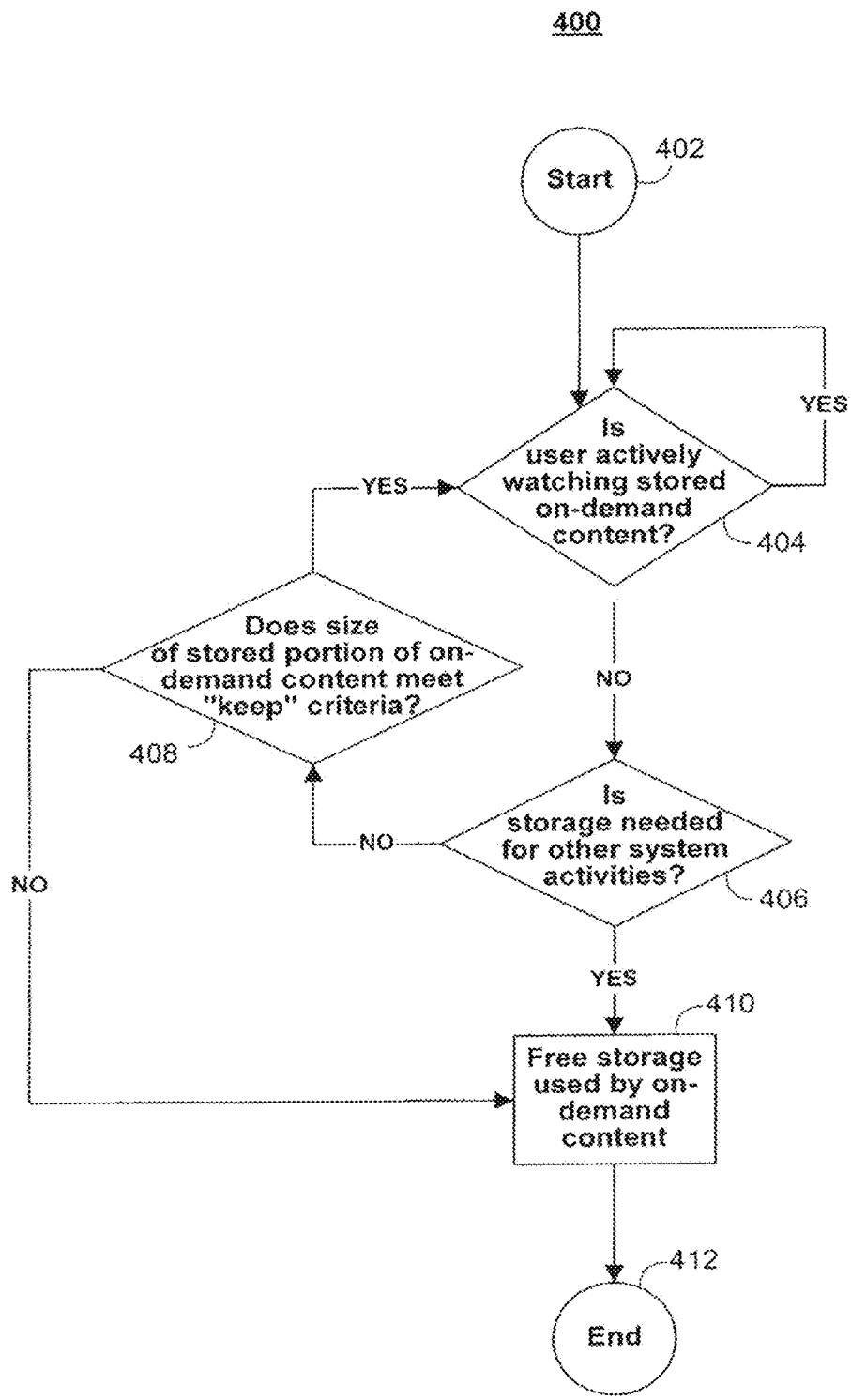

FIGS. 3 and 4 are flow charts of two illustrative processes for managing on-demand content in a local storage device as a function of dynamic factors that affect the availability in the local storage device. In these examples, the dynamic factors specified by the constraint criteria include determining whether the user is watching the program and determining whether storage is needed for other system activities (FIGS. 3 and 4), and whether "keep" criteria are met (FIG. 4). These examples assume as an initial state that the rental period has not expired (determining whether the rental period has not expired is not shown). Process 300 of FIG. 3 starts at step 302. At step 304, the on-demand client determines whether the user is actively watching an on-demand content that has been stored in local storage device 134 (FIG. 1). If the user is actively watching the on-demand content, the process repeats step 304 until the user is no longer watching the on-demand content.

If the user is not actively watching, or once the user is no longer actively watching, the on-demand content, process 300 moves to step 306 where the on-demand client determines whether the portion of local storage device 134 storing the on-demand content is needed by the system for other activities (such as storing new on-demand content. If space on local storage device 134 is not presently needed for other system activities, process 300 returns to step 304. If, space on local storage device 134 is needed for other system activities, the on-demand client deletes the on-demand content, making that portion of local storage device 134 available for other system activities (step 308). As described herein, deleting on-demand content includes deleting a portion of the on-demand content or deleting the entirety of the on-demand content stored in local storage device 134. Only a portion of the on-demand content may be deleted when only that portion is stored in local storage device 134 or when less disk space is needed than is used for the entire on-demand content stored in local storage device 134. Process 300 then ends at step 310.

Process 400 of FIG. 4 starts at step 402. At step 404, the on-demand client determines whether the user is actively watching an on-demand content that has been stored in local storage device 134. If the user is actively watching the on-demand content, the process repeats step 404 until the user is no longer watching the on-demand content.

If the user is not actively watching, or once the user is no longer actively watching, the on-demand content, process 400 moves to step 406 where the on-demand client determines whether the portion of local storage device 134 storing the on-demand content is needed by the system for other activities. If the portion local storage device 134 is not presently needed for other system activities, process 400 moves to step 408 where the on-demand client determines whether the portion of the stored on-demand content meets a "keep" criterion. For example, the on-demand content may be "kept" if, relative to the size of the entire on-demand content and/or the space available on the local storage device, a threshold amount of the program has been stored. If the keep criterion is met, process 400 returns to step 404. If local storage device 134 is needed for other system activities at step 406, or if the keep criterion is not met at step 408, process 400 moves to step 410 where the on-demand client deletes the on-demand content, making that portion of storage device 134 available for other system activities. Process 400 then ends at step 412.

In one or more variants of processes 300 and 400, the test of step 306 of process 300 and/or the test of step 406 of process 400 is further conditioned by a priority determination. In other words, the test is modified to read "Is storage needed for other 'higher priority' system activities."

Figure 5:
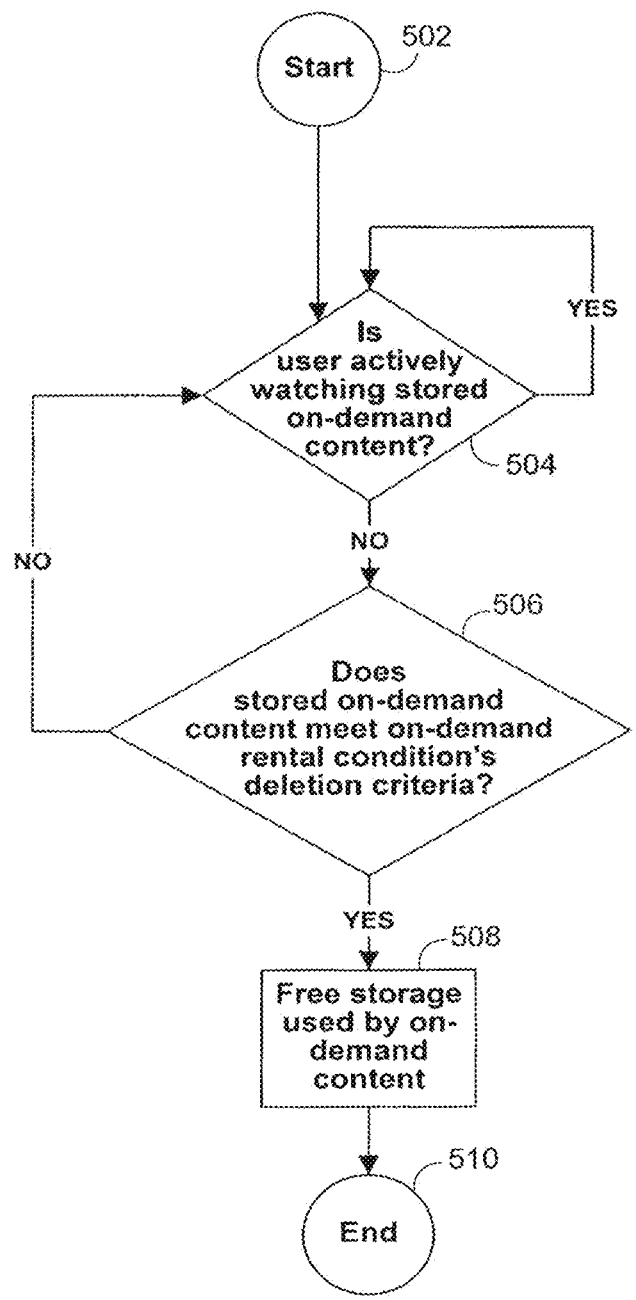
FIG. 5 is a flow chart of an illustrative process for deleting on-demand content in a local storage device as a function of a dynamic factor and on-demand rental conditions, in accordance with one embodiment of the invention.

FIG. 5 is a flow chart of an illustrative process for deleting on-demand content in a local storage device as a function of a dynamic factor (in this example, whether the user is watching the on-demand content) and on-demand rental conditions, in accordance with one embodiment of the invention. In this illustrative process, on-demand rental conditions are used by the on-demand client as deletion criteria for determining whether to delete a locally stored on-demand content. In such an approach, other rental conditions are used to otherwise control access to the programs.

Process 500 starts at step 502. At step 504, the on-demand client determines whether the user is actively watching an on-demand content that has been stored in local storage device 134. If the user is actively watching the on-demand content, the process repeats step 504 until the user is no longer watching the on-demand content. In some embodiments, the on-demand client may, based on some on-demand rental conditions (e.g., an outstanding balance overdue on a user's account), delete a locally-stored on-demand content, or prevent a user from viewing locally-stored on-demand content, even when the user is actively engaged in watching a program. This is not shown in process 500 to avoid overcomplicating the drawing.

If the user is not actively watching, or once the user is no longer actively watching, the on-demand content, process 500 moves to step 506 where the on-demand client determines whether the on-demand content meets the on-demand rental conditions and therefore should be deleted from local storage device 134 in this circumstance. If the on-demand content does not meet the on-demand rental condition's deletion criteria, process 500 returns to step 504. If the on-demand content meets the on-demand rental condition's deletion criteria, then in step 508, the on-demand client deletes the on-demand content, making the portion of the local storage device 134 available for other system activities. Process 500 then ends at step 510.

Figure 6:
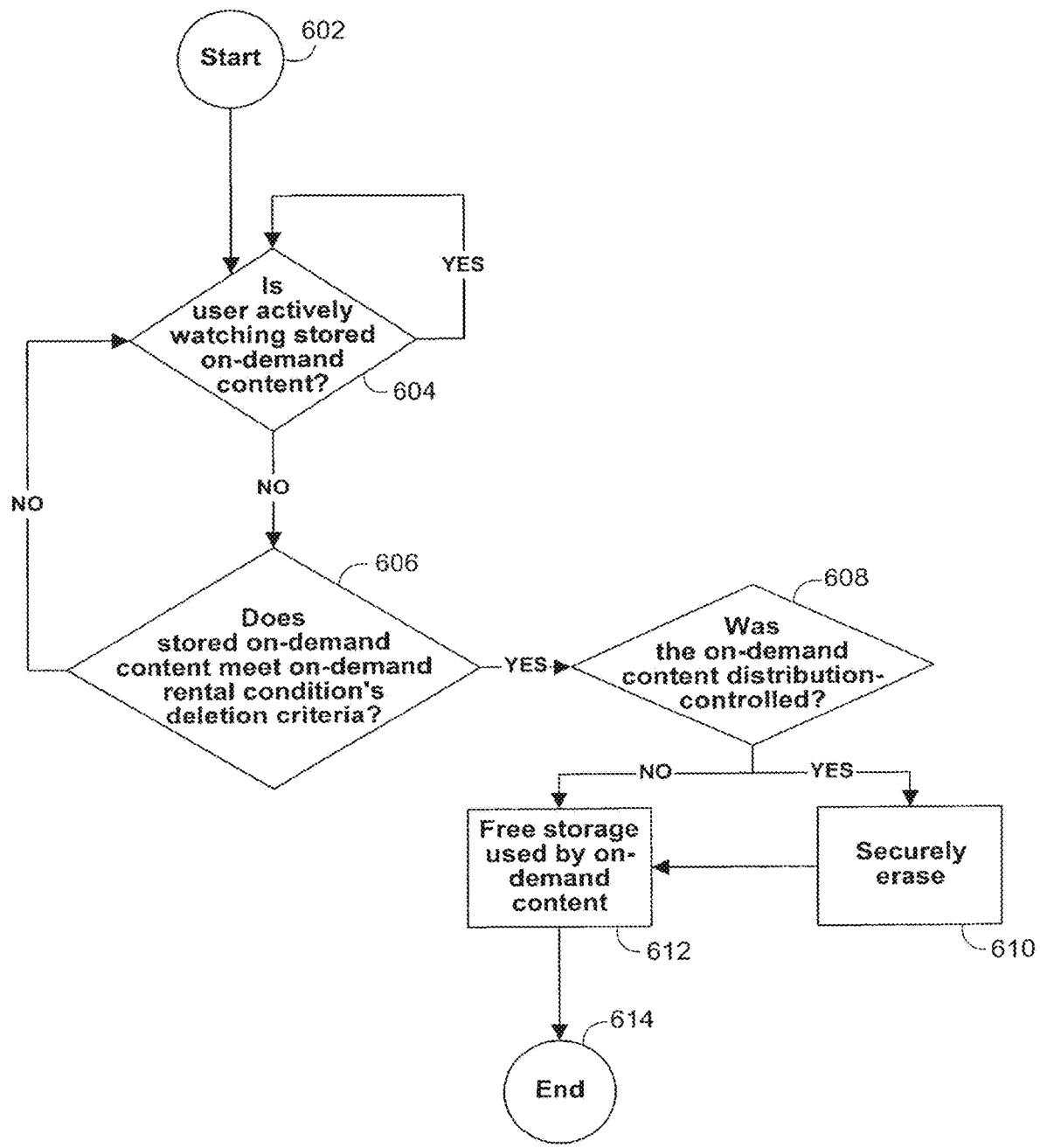
FIG. 6 is a flow chart of another illustrative process for deleting on-demand content from a local storage device as a function of a dynamic factor and on-demand rental conditions, in accordance with one embodiment of the invention.

FIG. 6 is a flow chart of an illustrative process for deleting on-demand content from a local storage device as a function of a dynamic factor (in this example, whether the user is watching a locally-stored on-demand content), and on-demand rental conditions, including whether the on-demand content needs to be securely erased, in accordance with one embodiment of the invention. In this illustrative process, on-demand rental conditions are used by the on-demand client as deletion criteria for determining whether to delete a locally stored on-demand content. In such an approach, other rental conditions are used to otherwise control access to the programs.

Note that typically, freeing storage in a computer system does not necessarily remove the data (and thus leaves it accessible). For example, in a Unix-based computer system, the system function free( ) simply removes pointers to the stored data, but leaves the data intact until the space is later overwritten by another process writing to a newly malloc( )'ed block that overlaps the previously freed portion of memory.

Process 600 starts at step 602. At step 604, the on-demand client determines whether the user is actively watching an on-demand content that has been stored in the local storage device. If the user is actively watching the on-demand content, the process repeats step 604 until the user is no longer watching the on-demand content. In some embodiments, the on-demand client may, based on some on-demand rental conditions (e.g., an outstanding balance overdue on a user's account), delete a locally-stored on-demand content, or prevent a user from viewing locally-stored on-demand content, even when the user is actively engaged in watching a program. This is not shown in process 600 to avoid overcomplicating the drawing.

If the user is not actively watching, or once the user is no longer actively watching, the on-demand content, process 600 moves to step 606 where the on-demand client determines whether the on-demand content meets the on-demand rental conditions that would indicate whether the on-demand content should be deleted from the local storage device 134 in this circumstance. If the on-demand content does not meet the on-demand rental condition's deletion criteria, process 600 returns to step 604. If the on-demand content meets the on-demand rental condition's deletion criteria, then in step 608, the on-demand client determines whether the on-demand content was distribution controlled (e.g., whether the copyrighted material was subject to distribution limitations).

If the on-demand content is distribution controlled, process 600 moves to step 610 where the on-demand client securely erases the on-demand content from local storage device 134. This can occur by overwriting the on-demand content (e.g., writing with multiple passes of various patterns to reduce the probability of recovery of the content) or by corrupting key portions of the on-demand content (e.g., using quantization matrices, CRC checks, headers) to render the on-demand content more difficult to play. Secure erasure can also be as simple a technique as setting a "broadcast" flag in the on-demand content to indicate that the content can no longer be distributed. Alternatively, a "never copy" flag can be set, or a "play once" flag can be reset, in digital rights management protocols such as IEEE 1394 5C. More information on IEEE 1394 5C can be found in "Digital Transmission Content Protection Specification Revision 1.4 (Informational Version)," Feb. 28, 2005, DTLA, www.dtcp.com, which is incorporated herein by reference in its entirety.

If the on-demand content is not distribution controlled or, alternatively, after step 610, process 600 moves to step 612 where the on-demand client deletes the on-demand content from the local storage device, making that portion of the local storage device available for other system activities. Process 600 then ends at step 614.

Figure 7:
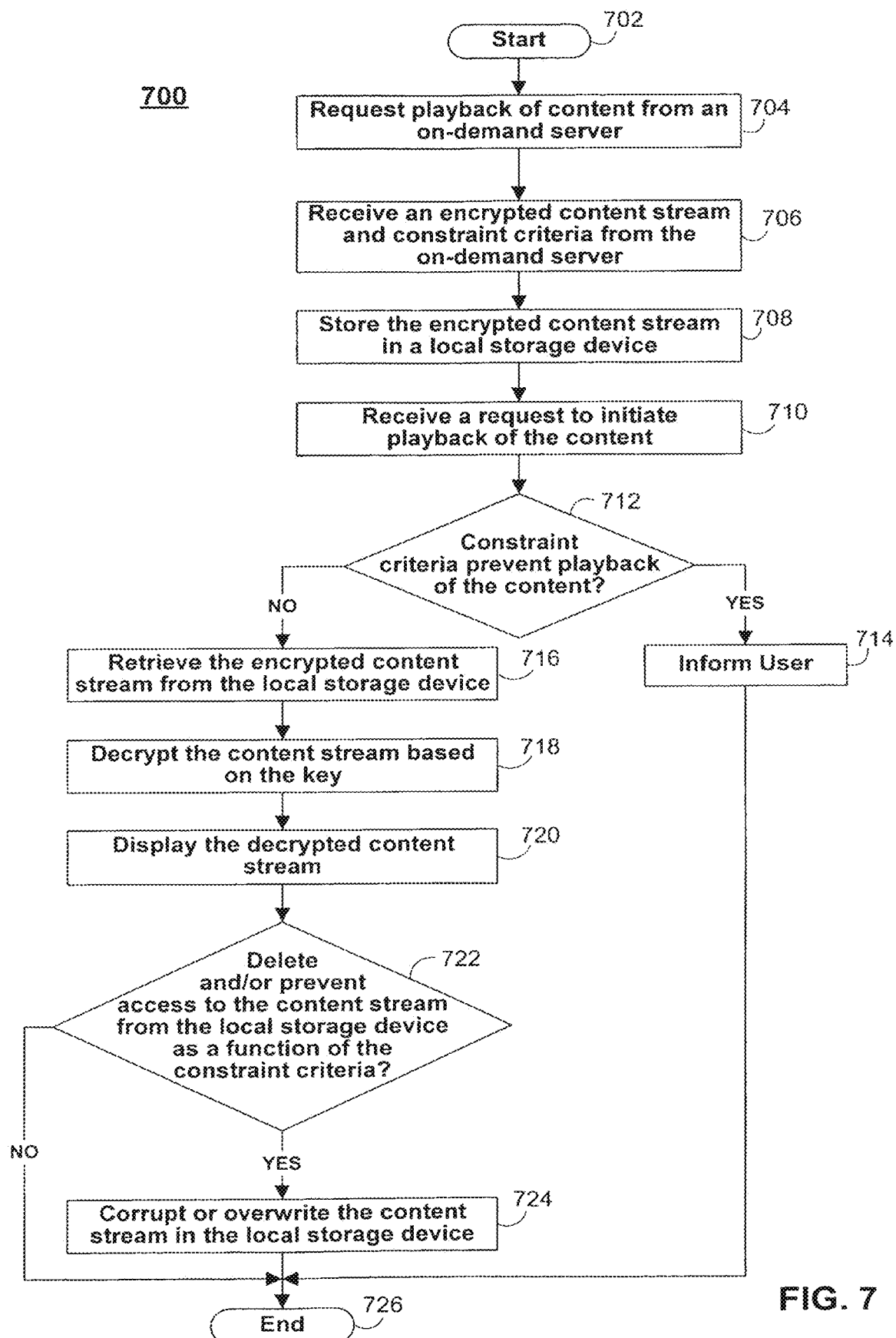
FIG. 7 is a flow chart of an illustrative process for managing locally-stored on-demand content as a function of keys and other constraint criteria in accordance with one embodiment of the present invention.

FIG. 7 is a flow chart of an illustrative process for managing locally-stored on-demand content as a function of keys and other constraint criteria in accordance with one embodiment of the present invention. Process 700 starts at step 702. At step 704, the on-demand client sends a request for playback of an on-demand content to remote on-demand server 150. At step 706, the on-demand client receives an encrypted content stream of the on-demand content and constraint criteria for the on-demand content from remote on-demand server 150. The constraint criteria include one or more keys and other constraint criteria (e.g., rental conditions or dynamic factors) for the on-demand content. At step 708, the on-demand client stores the encrypted content stream for the on-demand content in storage device 134. At step 710, the on-demand client receives a request to initiate playback of the on-demand content from storage device 134 via user input device 120. Note that this request may have been implicit in the request of step 704 or it may precede it.

At step 712, the on-demand client determines whether to prevent the playback of the on-demand content based on criteria other than the security-key specific constraint criteria. If playback of the on-demand content is prevented, process 700 moves to step 714 where processing circuitry informs the user, via a suitable display, of the nature of the restriction (e.g., nonpayment of a bill, expiration of the rental period, unavailability of the on-demand content) and the process ends at step 726. The user may also be offered an opportunity to enable the playback of the on-demand content (e.g., to pay an outstanding bill using a credit card, to purchase an extension on the rental period). Although not shown, if the user enables the playback of the on-demand content, process 700 then moves to step 716.

If playback of the on-demand content is not prevented at step 712, then at step 716, the on-demand client retrieves the encrypted content stream for the on-demand content from storage device 134. At step 718, it decrypts the encrypted content stream based on the keys from the constraint criteria. At step 720, it renders the decrypted content stream to display device 140.

At step 722, the on-demand client again checks the criteria other than the security-key specific constraint criteria and determines whether to delete and/or prevent access to the content stream from storage device 134. If the content stream is to be deleted from, and/or access is to be prevented from, storage device 134 at step 722, the on-demand client corrupts or overwrites the content stream in storage device 134 (step 724) and process 700 ends at step 726. If the content stream is to be maintained in, and retrievable from, storage device 134 at step 722, process 700 ends at step 726.

Figure 8:
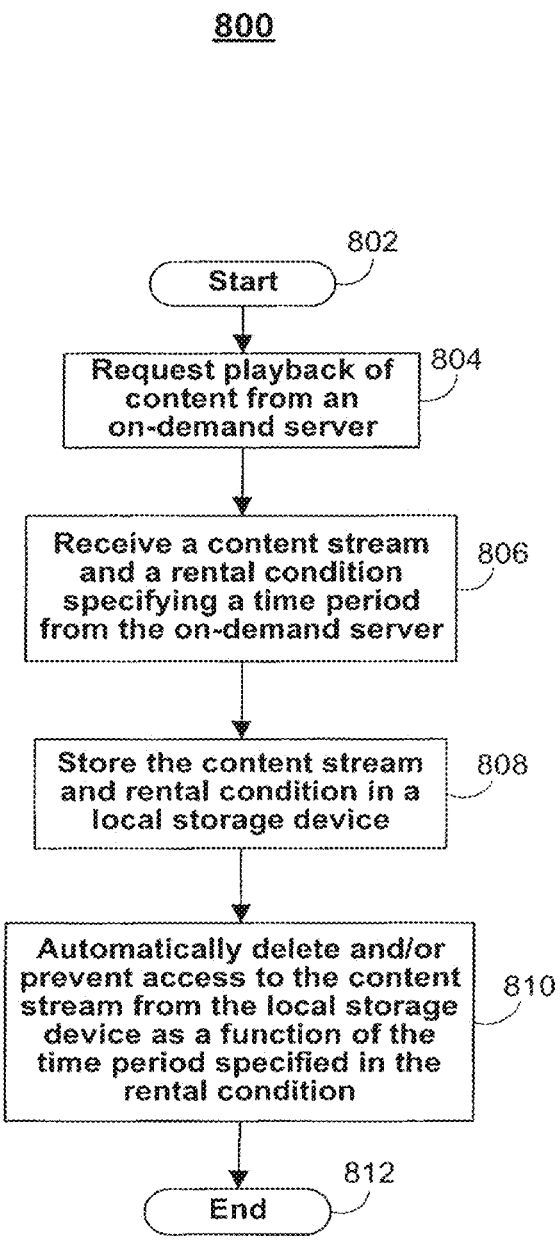
FIG. 8 is a flow chart of an illustrative process for managing locally-stored on-demand content as a function of a time period in accordance with one embodiment of the invention.

FIG. 8 is a flow chart of an illustrative process for managing locally-stored on-demand content as a function of a time period in accordance with one embodiment of the invention. Process 800 starts at step 802. At step 804, the on-demand client sends a request for playback of an on-demand content to remote on-demand server 150. At step 806, the on-demand client receives from remote on-demand server 150 a content stream for the on-demand content and as a rental condition, a time period for deleting and/or controlling access to the program. At step 808, the on-demand client stores the content stream for the on-demand content and the time period in storage device 134. At step 810, the on-demand client automatically deletes and/or prevents access to the content stream from storage device 134 after the specific time period. The process ends at step 812.

Figure 9:
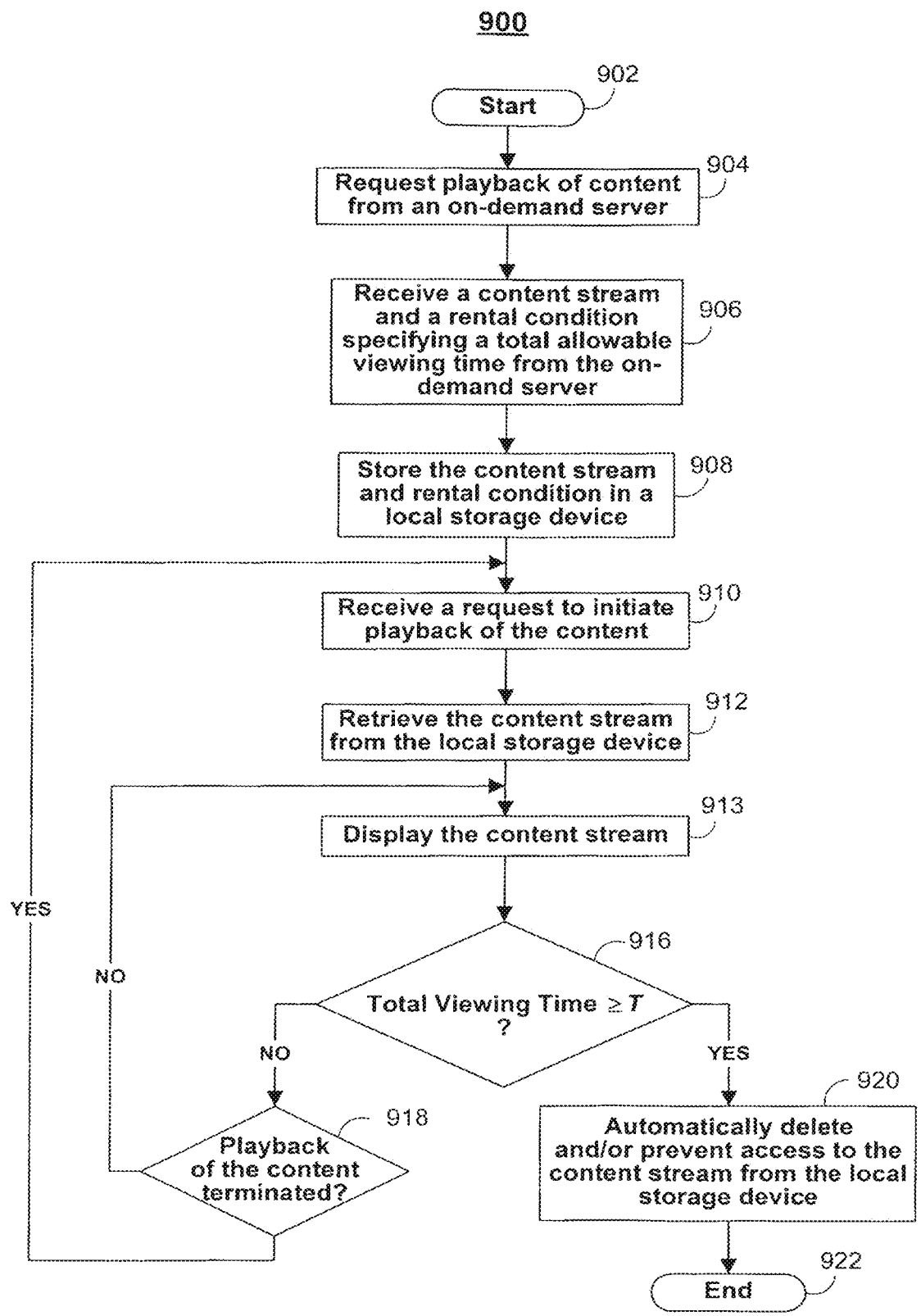
FIG. 9 is a flow chart of an illustrative process for managing locally-stored on-demand content as a function of a maximum amount of on-demand content viewing time in accordance with another embodiment of the present invention.

FIG. 9 is a flow chart of an illustrative process for managing locally-stored on-demand content as a function of a maximum amount of on-demand content viewing time in accordance with one embodiment of the present invention. Process 900 starts at step 902. At step 904, the on-demand client sends a request for playback of an on-demand content to remote on-demand server 150. At step 906, the on-demand client receives from remote on-demand server 150 a content stream for the on-demand content and a rental condition specifying a total viewing time for the on-demand content. At step 908, the on-demand client stores the content stream for the on-demand content and the condition in storage device 134. At step 910, the on-demand client receives a request to initiate playback of the on-demand content from storage device 134 via user input device 120. Note that this request may have been implicit in the request of step 904, or it may precede it. At step 912, the on-demand client retrieves the content stream for the on-demand content from storage device 134. At step 913, the on-demand client transmits the content stream to display device 140 for display.

At step 916, the on-demand client determines, as a function of the viewing time specified in the rental conditions, whether the amount of time spent viewing the on-demand content is greater than or equal to a maximum viewing time T (e.g., T is four hours or another suitable time). If the viewing time is less than the maximum viewing time, process 900 moves to step 918 where the on-demand client determines whether playback of the on-demand content has terminated. If playback of the content has not terminated, process 900 returns to step 913. Although not shown, while the on-demand client performs steps 916 and 918, if playback of the on-demand content has not terminated, it continues to send the content stream to display device 140 for display. If playback of the content has terminated at step 918, process 900 returns to step 910 where the on-demand client receives subsequent requests to initiate the playback of the content.

If the viewing time is greater than or equal to the maximum viewing time in step 916, process 900 moves to step 920 where the on-demand client automatically deletes and/or prevents access to the content stream from storage device 134. The process ends at step 922.

Figure 10:
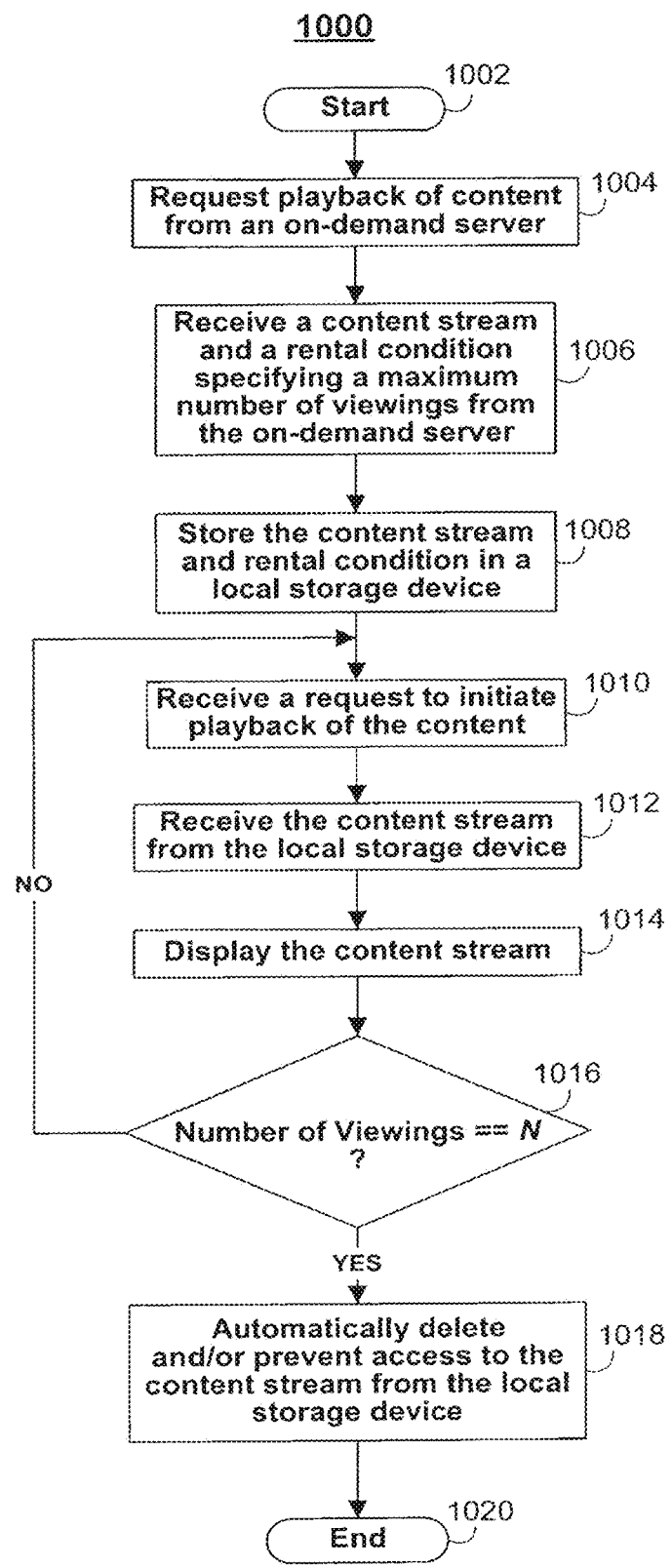
FIG. 10 is a flow chart of an illustrative process for managing locally-stored on-demand content as a function of a maximum number of on-demand content viewings in accordance with one embodiment of the present invention.

FIG. 10 is a flow chart of an illustrative process for managing locally-stored on-demand content as a function of a maximum number of on-demand content viewings in accordance with one embodiment of the present invention. Process 1000 starts at step 1002. At step 1004, the on-demand client sends a request for playback of an on-demand content to remote on-demand server 150. At step 1006, the on-demand client receives from remote on-demand server 150 a content stream for the on-demand content and a rental condition specifying a maximum number of viewings for the on-demand content. At step 1008, the on-demand client stores the content stream for the on-demand content and the rental condition in storage device 134. At step 1010, the on-demand client receives a request to initiate playback of the on-demand content from storage device 134 via user input device 120. Note that this request may have come prior to step 1004. At step 1012, the on-demand client retrieves the content stream for the on-demand content from storage device 134. At step 1014, the on-demand client sends the content stream to display device 140 for display. Note that here and in related embodiments, step 1014 may include sending only a portion of the on-demand content to the display.

At step 1016, the on-demand client determines whether the number of viewings of the on-demand content is equal to a maximum number of viewings N specified in the rental condition. If the number of viewings is less than the maximum number of viewings, process 1000 returns to step 1010 where the on-demand client receives subsequent requests to initiate the playback of the content. If the number of viewings is equal to the maximum number of viewings, process 1000 moves to step 1018 where the on-demand client automatically deletes and/or prevents access to the content stream from storage device 134. The process ends at step 1020.

Figure 11:
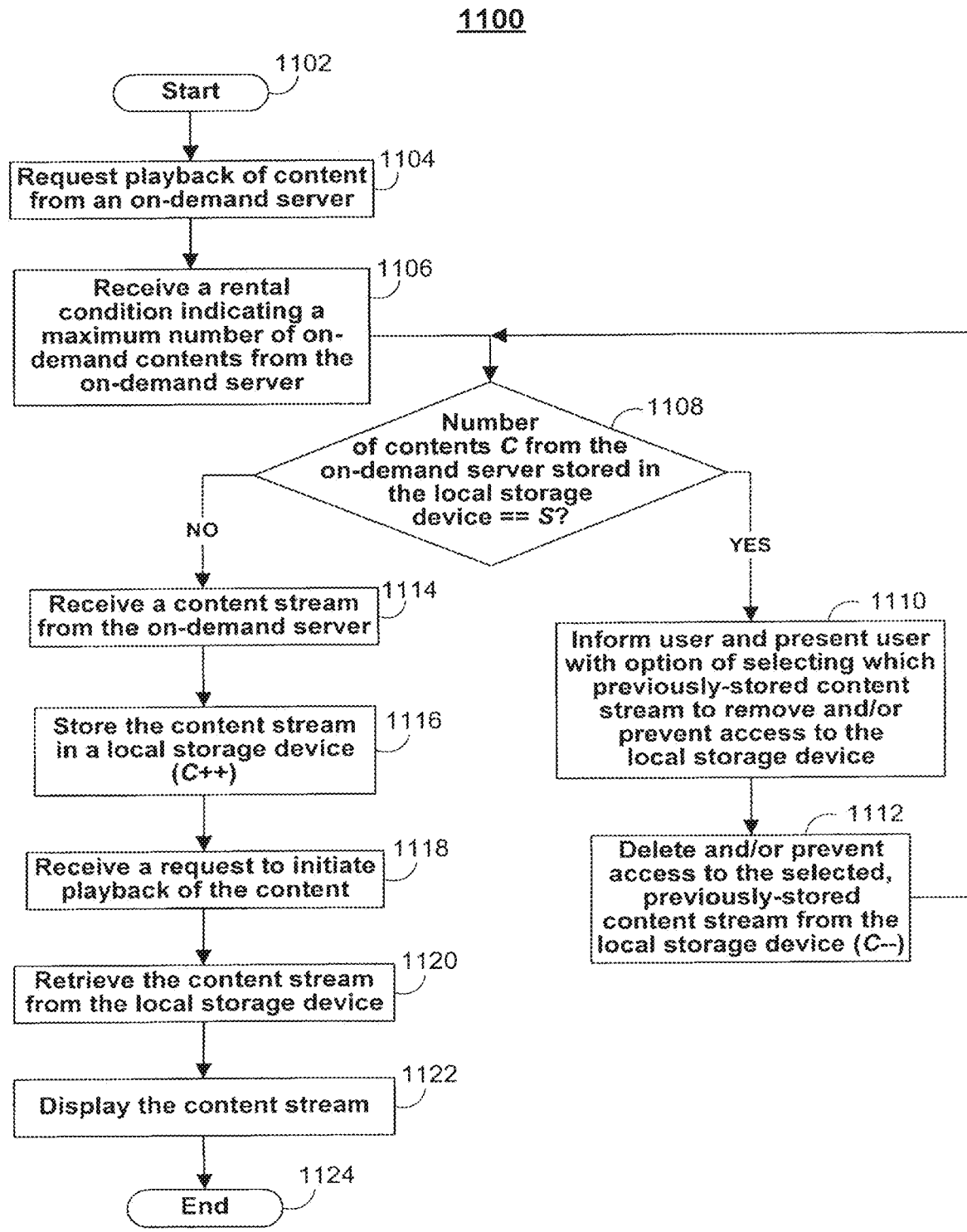
FIG. 11 is a flow chart of an illustrative process for managing locally-stored on-demand content as a function of a maximum number of on-demand contents that is allowed to be concurrently stored in a local storage device, in accordance with one embodiment of the invention.

FIG. 11 is a flow chart of an illustrative process for managing locally-stored on-demand content as a function of a maximum number of on-demand contents that are allowed to be concurrently stored in the local storage device, in accordance with one embodiment of the invention. Process 1100 starts at step 1102. At step 1104, the on-demand client sends a request for playback of an on-demand content, received from user input device 120, to remote on-demand server 150. At step 1106, the on-demand client receives from remote on-demand server 150 a rental condition indicating a maximum number S of contents C that may be stored by storage device 134. At step 1108, the on-demand client determines whether the number of on-demand contents C stored in storage device 134 is equal to the maximum number of on-demand contents S (e.g., four).

In this embodiment, the on-demand client maintains the counter C that indicates the number of on-demand contents currently stored in storage device 134. If the number of on-demand contents stored in storage device 134 is equal to the maximum number of on-demand contents, process 1100 moves to step 1110 where the on-demand client informs the user through a suitable display that the maximum number of on-demand contents are stored in storage device 134, and provides the user with an option to select one of the on-demand contents currently stored in storage device 134 for deletion. At step 1112, the on-demand client deletes the selected on-demand content from storage device 134 and decrements counter C by one (represented in FIG. 11 by the following programming code syntax: "C−−"). In another embodiment, the user may have the option to select more than one on-demand content currently stored in storage device 134 for removal at step 1110. In such an embodiment, counter C is decremented to reflect the number of on-demand contents removed from storage device 134. In yet another embodiment, the on-demand client may automatically delete one of the on-demand contents stored in storage device 134. After step 1112, process 1100 returns to step 1108.

If the number of on-demand contents C stored in storage device 134 is less than the maximum number of on-demand contents S at step 1108, process 1100 moves to step 1114 where the on-demand client receives a content stream for the on-demand content from remote on-demand server 150. At step 1116, the on-demand client stores the content stream for the on-demand content in storage device 134 and increments counter C by one (represented in FIG. 11 by the following programming code syntax: "C++"). At step 1118, the on-demand client receives a request to initiate playback of the on-demand content from storage device 134 via user input device 120. This request may be part of, or may precede the request of step 1104. At step 1120, the on-demand client retrieves the content stream for the on-demand content from storage device 134. At step 1122, the on-demand client sends the content stream to display device 140 for display. Process 1200 then ends at step 1124.

In some embodiments, the on-demand client may associate flags with locally-stored on-demand content to control the deletion of and/or access to the on-demand content. These flags may be stored, for example, in a table or directory on storage device 134. There may be a delete flag, a control access flag, or one flag for deleting and controlling access to a given on-demand content. The on-demand client may set the flags as a function of the constraint criteria including, for example, the on-demand rental conditions, the keys, or dynamic factors.

For example, the on-demand client may set a control-access flag when an on-demand content is content-protected (e.g., single-user purchased, copyright protected, or distribution-limited) and constraint criteria are met to indicate that the program is not to be accessed, or accessed only with a key. The on-demand client may, upon determining that a control-access flag is set, alter (e.g., corrupt) the bit representation of the content stream stored in storage device 134 to prevent the user from viewing the video after the on-demand rental period. The on-demand client may alter the bit representation of the video by randomly modifying cyclic redundancy check (CRC) bits in various packets of the stored video, inserting null packets at regular intervals of the stored video, replacing quantization matrices with zero bits, reordering various packets of the stored video, or any other suitable alteration. Upon or during an attempted playback of the on-demand content, the on-demand client may examine the control-access flag, see that it is set, and determine whether it has the appropriate key for decoding the program. If it does not, the on-demand client may indicate to the user that the program is not accessible, or that the user may gain access only after paying a fee.

As another example of how flags are used, the on-demand client may set a flag indicating that the on-demand content is to be deleted from storage device 134. When another on-demand content is to be recorded (or when space on recording device 134 is otherwise needed), the on-demand client may examine the delete flag to determine if it is set, and overwrite the program with the new one.

Figure 12:
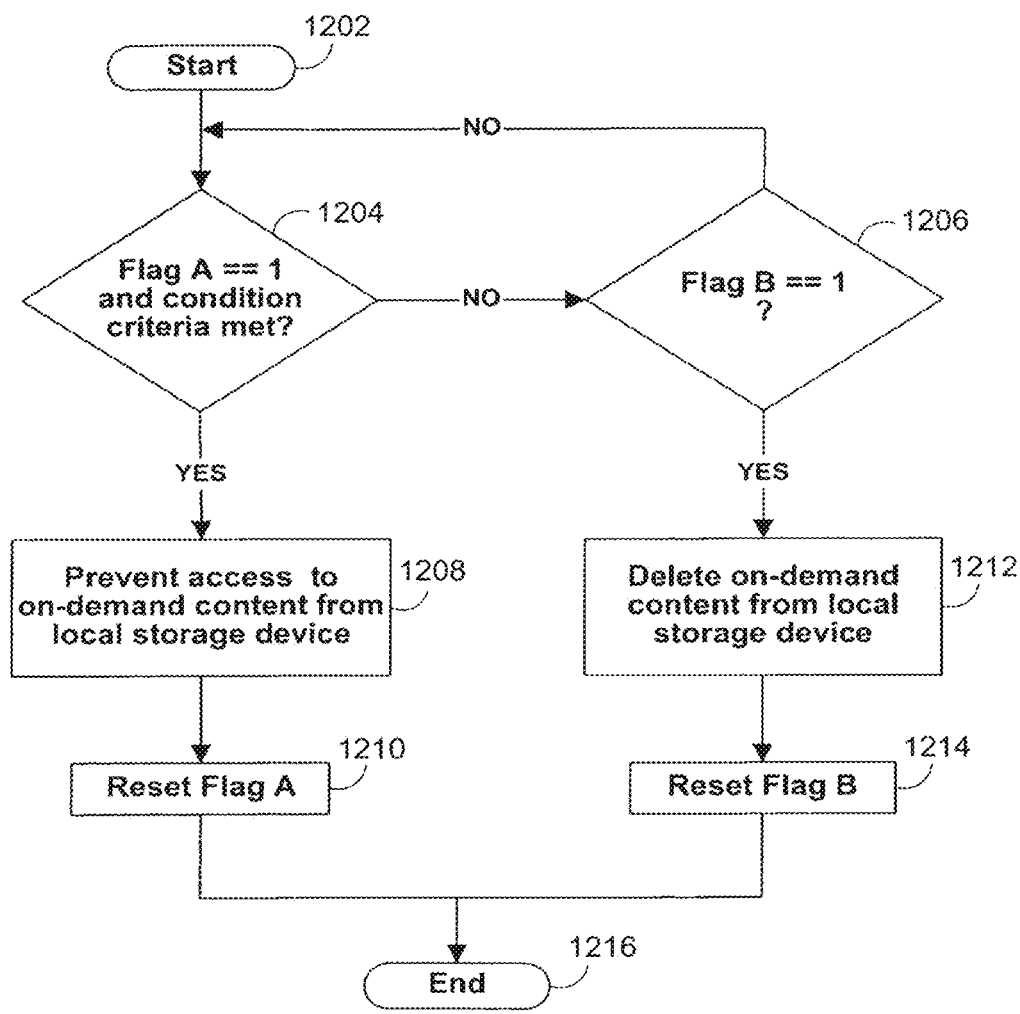
FIG. 12 is a flow chart of an illustrative process for managing locally-stored on-demand content using flags in accordance with one embodiment of the invention.

FIG. 12 is a flow chart of an illustrative process for managing locally-stored on-demand content using flags in accordance with one embodiment of the invention. Process 1200 starts at step 1202. At step 1204, the on-demand client determines whether to prevent the user from accessing the on-demand content from storage device 134 by determining whether a control-access flag (Flag A) associated with the on-demand content is set (e.g., to binary "1"). If the control-access flag is not set, process 1200 moves to step 1206.

If the control-access flag is set, process 1200 moves to step 1208 where the on-demand client prevents the user from accessing the on-demand content from storage device 134 (e.g., by altering the bit representation of the on-demand content). At step 1210, the on-demand client resets the control-access flag (e.g., to binary "0"). This second flag may be subsequently used in association with another on-demand content that is later stored in storage device 134. Process 1200 then ends at step 1216.

At step 1206, the on-demand client determines whether to delete an on-demand content from storage device 134 by determining whether a deletion flag (Flag B) associated with the on-demand content is set. If the deletion flag is not set, process 1200 returns to step 1204. If the deletion flag is set, process 1200 moves to step 1212 where the on-demand client deletes the on-demand content from storage device 134 by, for example, replacing the on-demand content with other content. At step 1214, the on-demand client resets the second flag.

In some embodiments, after the on-demand client prevents the user from accessing the on-demand content from storage device 134 at step 1208 and resets the control-access flag at step 1210, it may continue to check the delete flag (at step 1206) until the delete flag is set in order to delete the on-demand content from storage device 134.

Although not shown, during process 1200, the on-demand client continually monitors the on-demand rental conditions associated with each locally-stored on-demand content. In response to any of the on-demand contents satisfying an on-demand rental condition, the flags corresponding to that on-demand content are set accordingly.

The processes shown in FIGS. 3-12 are illustrative. Steps may be performed in a different order, steps may be omitted, or steps may be added as appropriate.

Thus, it is seen that systems and methods are provided for storing on-demand content in a local storage device and managing the locally-stored on-demand content as a function of certain on-demand constraint criteria. One skilled in the art will appreciate that the invention can be practiced by other than the described embodiments, which are presented for purposes of illustration and not of limitation, and the present invention is limited only by the claims which follow.

What is claimed is:

1. A method for managing at least a portion of on-demand content provided by an on-demand server and stored in a storage device that is local to an on-demand client, the method comprising:
   receiving an on-demand rental condition, from a remote server, which constrains deletion of the at least a portion of the on-demand content that is stored on the storage device, in accordance with an on-demand provider's rental policies, wherein the on-demand rental condition is defined without input from a user and specifies a maximum total viewing time for the on-demand content allowed by the on-demand provider, wherein the maximum total viewing time is a total time the content plays;
   providing a plurality of viewing sessions for the content, wherein each viewing session is separated by a period of time; and
   controlling deletion of the at least a portion of the on-demand content as a function of the on-demand rental condition and the plurality of viewing sessions.

2. The method of claim 1, wherein the on-demand rental condition further specifies at least one usage limit specifying a maximum number of on-demand contents stored in the storage device at a given time, and further comprising:
   receiving a second request to access a second on-demand content; and
   restricting access to the second request in response to determining that the number of on-demand contents currently stored in the storage device has reached the at least one usage limit.

3. The method of claim 1, further comprising:
   receiving a dynamic factor which constrains deletion of the at least a portion of the on-demand content stored on the storage device based on conditions of equipment on which the on-demand client is implemented; and
   controlling deletion of the at least a portion of the on-demand content as a function of the dynamic factor.

4. The method of claim 3, wherein the dynamic factor specifies determining whether the user is watching the on-demand content, determining whether the storage device is available, or determining whether the at least a portion of the on-demand content meets a keep criterion.

5. The method of claim 3, wherein controlling deletion of the at least a portion of the on-demand content on the storage device comprises:
   determining that a user of the on-demand client is not actively watching the at least a portion of the on-demand content; and
   deleting the at least a portion of the on-demand content from the storage device in response to the determining.

6. The method of claim 3, wherein controlling deletion of the at least a portion of the on-demand content on the storage device comprises:
   determining that a user of the on-demand client is not watching the at least a portion of the on-demand content and that space on the storage device is needed for other system activities; and
   deleting the at least a portion of the on-demand content from the storage device in response to the determining.

7. The method of claim 1, wherein controlling deletion of the at least a portion of the on-demand content on the storage device comprises:
   determining that the user of the on-demand client is not watching the at least a portion of the on-demand content, that space on the storage device is needed for other system activities, and that the space used by the at least a portion of the on-demand content on the storage device is less than a specified minimum keep threshold; and
   deleting the at least a portion of the on-demand content from the storage device in response to the determining.

8. The method of claim 1, wherein the on-demand rental condition is received by processing circuitry from at least one of an on-demand server and a third-party rights-management server.

9. The method of claim 1, wherein the on-demand rental condition is a function of a rating of the on-demand content.

10. The method of claim 1, further comprising:
   receiving a key according to which the at least a portion of the on-demand content may be decrypted;
   decrypting the at least a portion of the on-demand content as a function of the key; and
   playing back the decrypted at least a portion of the on-demand content.

11. A system for managing at least a portion of on-demand content provided by an on-demand server and stored in a storage device that is local to an on-demand client, the system comprising:
   control circuitry configured to:
      receive an on-demand rental condition, from a remote server, which constrains deletion of the at least a portion of the on-demand content that is stored on the storage device, in accordance with an on-demand provider's rental policies, wherein the on-demand rental condition is defined without input from a user and specifies a maximum total viewing time for the on-demand content allowed by the on-demand provider, wherein the maximum total viewing time is a total time the content plays;

provide a plurality of viewing sessions for the content, wherein each viewing session is separated by a period of time; and control deletion of the at least a portion of the on-demand content as a function of the on-demand rental condition and the plurality of viewing sessions.

12. The system of claim 11, wherein the on-demand rental condition further specifies at least one usage limit which specifies a maximum number of on-demand contents stored in the storage device at a given time, and wherein the control circuitry is further configured to:

receive a second request to access a second on-demand content; and restrict access to the second request in response to the determination that the number of on-demand contents currently stored in the storage device has reached the at least one usage limit.

13. The system of claim 11, wherein the control circuitry is further configured to:

receive a dynamic factor which constrains deletion of the at least a portion of the on-demand content stored on the storage device based on conditions of equipment on which the on-demand client is implemented; and control deletion of the at least a portion of the on-demand content as a function of the dynamic factor.

14. The system of claim 13, wherein the dynamic factor specifies a determination of whether the user is watching the on-demand content, a determination of whether the storage device is available, or a determination of whether the at least a portion of the on-demand content meets a keep criterion.

15. The system of claim 13, wherein, to control deletion of the at least a portion of the on-demand content on the storage device, the control circuitry is further configured to:

determine that a user of the on-demand client is not actively watching the at least a portion of the on-demand content; and delete the at least a portion of the on-demand content from the storage device in response to the determination.

16. The system of claim 13, wherein, to control deletion of the at least a portion of the on-demand content on the storage device, the control circuitry is further configured to:

determine that a user of the on-demand client is not watching the at least a portion of the on-demand content and that space on the storage device is needed for other system activities; and delete the at least a portion of the on-demand content from the storage device in response to the determination.

17. The system of claim 11, wherein, to control deletion of the at least a portion of the on-demand content on the storage device, the control circuitry is further configured to:

determine that the user of the on-demand client is not watching the at least a portion of the on-demand content, that space on the storage device is needed for other system activities, and that the space used by the at least a portion of the on-demand content on the storage device is less than a specified minimum keep threshold; and delete the at least a portion of the on-demand content from the storage device in response to the determination.

18. The system of claim 11, wherein the on-demand rental condition is received by processing circuitry from at least one of an on-demand server and a third-party rights-management server.

19. The system of claim 11, wherein the on-demand rental condition is a function of a rating of the on-demand content.

20. The system of claim 11, wherein the control circuitry is further configured to:

receive a key according to which the at least a portion of the on-demand content may be decrypted;

decrypt the at least a portion of the on-demand content as a function of the key; and play back the decrypted at least a portion of the on-demand content.

* * * * *